United States Patent [19]

Howard et al.

[11] Patent Number: 4,713,185
[45] Date of Patent: Dec. 15, 1987

[54] SACRIFICIAL AGENTS FOR ENHANCED OIL RECOVERY

[75] Inventors: John Howard, Vancouver; Marie Stirling, Surrey, both of Canada

[73] Assignee: Canadian Patents and Development Ltd., Ottawa, Canada

[21] Appl. No.: 715,368

[22] Filed: Mar. 25, 1985

[51] Int. Cl.$^4$ .............................................. E21B 43/22
[52] U.S. Cl. ................................. 252/8.554; 166/274; 166/275
[58] Field of Search ........... 252/8.55 D, 8.5 C, 8.5 R, 252/8.554, 8.51; 210/928; 166/274, 275

[56] References Cited

U.S. PATENT DOCUMENTS

| | | | |
|---|---|---|---|
| 2,491,832 | 12/1949 | Salvesen et al. | 252/353 X |
| 2,819,295 | 1/1958 | Herrick et al. | 260/473.6 |
| 2,935,504 | 5/1960 | King et al. | 252/8.5 X |
| 3,232,925 | 2/1966 | King et al. | 260/124 |
| 3,278,425 | 10/1966 | King et al. | 252/8.5 |
| 3,522,844 | 8/1970 | Abdo | 166/270 |
| 3,546,197 | 12/1970 | Benko | 8/589 X |
| 3,652,407 | 3/1972 | Paleos | 210/928 X |
| 4,006,779 | 2/1977 | Kalfoglou | 166/275 |
| 4,069,217 | 1/1978 | Detroit et al. | 252/8.5 X |
| 4,133,385 | 1/1979 | Kalfoglou | 166/273 |
| 4,142,582 | 3/1979 | Kalfoglou | 166/273 |
| 4,157,115 | 6/1979 | Kalfoglou | 166/273 |
| 4,235,290 | 11/1980 | Kalfoglou | 166/273 |
| 4,236,579 | 12/1980 | Kalfoglou | 166/274 |
| 4,273,191 | 6/1981 | Hradel | 166/305 |
| 4,313,500 | 2/1982 | Johnson, Jr. et al. | 166/273 |
| 4,611,659 | 9/1986 | DeBons et al. | 166/275 X |

FOREIGN PATENT DOCUMENTS

| | | | |
|---|---|---|---|
| 547334 | 10/1957 | Canada | 210/928 |
| 582532 | 9/1959 | Canada | . |
| 666381 | 7/1963 | Canada | 260/95 |
| 806172 | 2/1969 | Canada | 260/120 |
| 874148 | 6/1971 | Canada | 210/928 |

OTHER PUBLICATIONS

Wood Chemicals Inject New Life Into Tired Oil Wells, Chemical Week, Jun. 20, 1979.
Chemicals for Enhanced Oil Recovery Biennial Report, Apr. 1978–Mar. 1980 A. L. Compere, et al., Oak Ridge National Laboratory, Oak Ridge, Tenn., 37830, Mar. 1981, pp. vi and vii.
American Can and Texaco Sign Agreement on Lignin, Paper Trade Journal, Jun. 30, 1979.

*Primary Examiner*—Herbert B. Guynn

[57] ABSTRACT

Sacrificial agents employed in methods of obtaining oil from rock formations by surfactant flooding comprising oxidized and/or chlorinated lignin and lignin-like derivatives obtained form inexpensive and readily available sources. In one form of the invention such derivatives present in E-stage wood pulp bleach plant effluent are concentrated by the use of macroporous resins, reverse osmosis or membrane dialysis. In another form of the invention, new sources of the derivatives are provided from forest industry by-products. In a further form of the invention, the derivatives are complexed with iron which significantly improves the sacrificial agent activity of the derivatives. Such sacrificial agents reduce the amount of expensive surfactant required in the oil recovery method.

3 Claims, No Drawings

SACRIFICIAL AGENTS FOR ENHANCED OIL RECOVERY

BACKGROUND OF THE INVENTION

1. Field of the Invention

The invention relates to sacrificial agents used in enhanced oil recovery techniques, to methods of producing such sacrificial agents and to enhanced oil recovery techniques employing such agents.

2. Description of the Prior Art

At best only about 50% of the oil in a subterranean reservoir can be drawn to the surface by conventional methods (sometimes referred to as primary recovery methods because they use the natural energy of an oil reservoir to force the oil up through the well to the surface). However, enhanced oil recovery techniques (sometimes referred to as secondary and tertiary recovery methods) make it possible to obtain up to half as much oil again from existing wells. One such enhanced method is a surfactant flooding technique which involves forcing water containing a surfactant from an input well through the oil-bearing rock formation to a production well. The surfactant makes the oil more miscible with the water so that oil displacement is easier to achieve. The surfactant flooding technique holds considerable promise provided that the cost of the surfactant used to release the oil from the substrata allows for a reasonable profit on the recovered oil. At present, the surfactant is the single most costly item in the economics of the surfactant-based oil recovery system.

The amount of surfactant required in such recovery systems is quite large because a large proportion is adsorbed on the subterranean formation and hence is unavailable for oil mobilization. These losses can be reduced if the sites on the oil bearing rock which normally attract the surfactants are treated with low cost so-called sacrificial agents which prevent the surfactant from being adsorbed. Consequently most or all of the surfactant then becomes available for oil mobilization.

Attempts to explain sacrificial activity on the basis of chemical structures have had little success, but physical factors, such as molecular weight and possibly the ability to form electrically charged micellar solutions, may be important. Moreover, some so-called sacrificial agents may exert their effect by acting themselves as surfactants, so the term "sacrificial agents" as used herein is intended to include all such low cost agents which can reduce the amount of conventional surfactant used in the surfactant flooding technique, irrespective of the manner in which they work.

Certain alkaline inorganic salts, e.g. sodium phosphates and sodium silicates, and certain organic materials, e.g. lignosulphonates and modified lignosulphonates, have been suggested for use as sacrificial agents (see, for example, U.S. Pat. No.3,688,844 issued on Sept. 5, 1972 to W. O. Roszelle; U.S. Pat. No. 4,133,385 issued to Texaco Inc. on Jan. 9, 1979; U.S. Pat. No. 4,142,582 issued to Texaco Inc. on Mar. 6, 1979; U.S. Pat. No. 4,157,115 issued to Texaco Inc. on June 5, 1979; U.S. Pat. No. 4,235,290 issued to Texaco Inc. on Nov. 25, 1980; U.S. Pat. No. 4,236,579 issued to Texaco Inc. on Dec. 2, 1980).

The organic sacrificial agents appear to be more cost effective than the inorganic materials and they are generally derived from spent sulphite liquor generated as a by-product during the pulping of wood using the sulphite cooking process.

Other organic sacrificial agents referred to in the prior art are sulphonated alkali lignins (kraft black liquor lignin sold under the trade mark Indulin; see U.S. Pat. No. 4,235,290 mentioned above).

The effectiveness of lignosulphonates as sacrificial agents has spurred investigation of other pulping industry by-products for use in this area. This research has concentrated mainly on pulp bleach plant effluents as sacrificial agents and E-stage bleach plant effluents have been identified as effective for prevening adsorption of anionic surfactants (sulphonated oil type surface active agents) on clays and sandstones. E-stage liquor is a by-product of the well known process of bleaching wood pulp before it is used for paper-making or the like. The pulp is first treated with chlorine (the so-called C-stage) and then with alkali (the E-stage). During tests, pretreatment of oil bearing cor samples with these forest industry byproducts has increased the amount of oil emulsified and recovered by subsequent flooding with surfactant solution by as much as 58% (see U.S. Pat. No. 4,313,500 issued to the U.S. Department of Energy on Feb. 2, 1982).

The main disadvantage of the use of E-stage bleach plant effluent, however, is the low concentration of active ingredients in the liquid (e.g. the total solids content of typical E-stage liquor is generally 0.2–1% by weight). Thus shipment of the product to distant oil wells or evaporation to increase concentration levels is prohibitively expensive. Another drawback is that the effectiveness of E-stage liquor decreases dramatically with time e.g. during storage.

Thus there is a need for sacrificial agents which are not only inexpensive, but which are also highly effective, easy to obtain in concentrated form, and which do not deteriorate significantly with time.

An object of the invention is to provide sacrificial agents preferably from forest industry or agricultural sources, e.g. the effluent from wood treatment processes.

Another object of the invention is to provide sacrificial agents derived from E-stage liquor which are in fairly concentrated form so that shipment or evaporation to dryness is fairly economical.

Another object of the invention is to provide sacrificial agents which are of improved effectiveness and are thus economical to use.

SUMMARY OF THE INVENTION

In one aspect, the invention makes use of the discovery that the agents in various forest industry effluent liquids that are effective as sacrificial agents (e.g. E-stage liquor) can be concentrated easily and economically by a variety of techniques, e.g. adsorption onto macroporous resins, reverse osmosis or membrane filtration. This is because the active ingredients, which are high molecular weight oxidized and/or chlorinated lignin derivatives, may be isolated and concentrated by these techniques whereas non-active low molecular weight components derived from cellulose are not isolated.

In another aspect, the invention makes use of the fact that the active ingredients of such forest industry liquids, i.e. oxidized and/or chlorinated lignin derivatives, are more effective as sacrificial agents when used in the form of complexes with ferrous or ferric ions.

DETAILED DESCRIPTION OF THE PREFERRED EMBODIMENTS

The first aspect of the invention is primarily concerned with concentrating the dilute solutions of sacrificial agents obtained from caustic bleach plant effluent liquor, i.e. E-stage liquors. Other sources of sacrificial agents, as mentioned in more detail later, generally give solutions of quite high concentration, so increasing their concentration by the method of the present invention may not be necessary. However, the concentration method of the present invention can if desired be applied to any sacrificial agent based on lignin or lignin-like derivatives, (i.e. polyphenolic compounds having a molecular weight of at least 700), so it should not be considered limited only to sacrificial agents derived from E-stage liquors.

The second aspect of the invention concerns the enhancement of the sacrificial agent activity of agents derived from lignin and lignin-like polyphenolic compounds achieved by complexing the agents with iron.

It should be noted that the two aspects can be carried out in sequence. That is, a weak solution of a sacrificial agent may first be concentrated according to the first aspect of the invention and may then be complexed with iron according to the second aspect of the invention. The two aspects may, on the other hand, be employed independently, i.e. the concentrated sacrificial agent obtained by the first aspect of the invention may be used without iron complexing, or iron complexing may be carried out on sacrificial agents obtained in dilute form or those derived from sources which give a concentrated product. If the concentration and iron addition steps are both used, however, iron addition should take place only after concentration has been carried out.

The two aspects of the invention referred to above are explained in detail below.

(a) Method of concentrating sacrificial agents obtained from forest products and the like.

As discussed above, E-stage liquor has been identified as a useful sacrificial agent, but the active ingredient is so dilute that the product is expensive to transport and to concentrate by evaporation of the excess water.

Bleach plant effluent such as E-stage liquor has a brownish colour. It is known that the effluent can be decolourized and detoxified by passing it through a decolourizing resin. The inventors of the present invention have found that the ingredients in such effluents which are removed by the resin during the decolourizing and detoxifying step are also the ingredients which impart the sacrificial activity to the effluent solution. Thus the decolourizing resins can be used to concentrate the sacrificial agents in a simple and cost effective manner.

The inventors have found that the sacrificially active ingredients of E-stage liquor are oxidized and/or chlorinated lignin derivatives and these are the materials adsorbed by the resin. It is not possible to specify the exact chemical nature of such derivative. Lignin itself is a complex polymer so that an exact description of oxidized and chlorinated lignin is not possible. C. W. Dence and G. E. Annergren in "Bleaching of Pulp", Third Edition, Tappi Press 1979, have described the most likely structures based upon studies of the reaction of chlorine with lignin model compounds. It is generally agreed that chlorine reacts with lignin during the C-stage bleaching step in two distinct ways:

(a) substitution reactions where aliphatic and aromatic hydrogens in lignin are replaced by chlorine atoms.

(b) oxidation reactions where chlorine results in lignin demethylation to give catechol and 1,2 benzoquinone derivatives. These compounds in turn are readily converted to soluble muconic acid derivatives by reaction with caustic soda used during the subsequent E-stage extraction step.

Both the chlorination substitution and oxidation reactions take place more or less simultaneously so that mixtures of chlorinated and oxidized lignins are both present in the E-stage liquor. The mixtures are polymers which have a spectrum of molecular weights, the higher range being of greater interest to the present invention.

As noted above, the decolorizing resins trap the oxidized and/or chlorinated lignin or lignin-like derivatives, while allowing colourless saccharinic acid salts, NaCl, etc. to pass. These colourless products do not show any sacrificial agent activity.

The oxidized and/or chlorinated lignin or lignin-like derivatives thus adsorbed can be eluted from the decolourizing resin by a suitable eluant liquid, e.g. 1.5N sodium hydroxide. The amount of eluant liquid required is quite small, so that a significant increase (e.g. 10 to 20 fold) in concentration compared with the untreated liquor can be obtained. The eluate is generally neutralized prior to use. The resins which are effective include those commercially available for decolorizing and detoxifying bleach plant effluent, e.g. the weak base anion exchange resin sold under the trade mark DOW XF-4004. This is a macroporous weak base resin which has been specifically developed for bleach plant effluent decolorization.

The method involves passing the effluent liquor, without pH adjustment, under ambient conditions slowly through a column or bed of the wet resin beads in an amount below that required to saturate the bed (usually about 40 bed volumes of the liquid). Then the eluant is passed slowly through the column or bed, using the smallest volume required to achieve full elution.

The conditions under which the adsorption and elution take place are not particularly important, but high temperatures (e.g. 80–100° C.) may reduce the effective lifetime of the resin and should therefore preferably be avoided. Ambient temperatures (e.g. 21° C.) are preferred. The resin should of course be converted to a suitable ionic form (e.g. the sulphate ion form by treatment with 1.5N $H_2SO_4$) prior to the adsorption step. When using commercially available resins, the manufacturer's instructions regarding the method of activation, the adsorption step and the elution step should be followed.

As well as the resin mentioned above, the following commercially available resins may be employed: DOWEX-4 (trade mark, a weak bae exchange resin sold by Dow Chemical Co. Ltd.); DOWEX-1, -2, -11, -21K (trade marks, strong base exchange resins sold by Dow Chemical Co. Ltd.) DOWEX-SAR, -SBR, WGR (trade marks, strong base exchange resins sold by Dow Chemical Co. Ltd.); DUOLITE A-7, A-30 (trademarks, weak base exchange resins sold by Diamond Shamrock Co.); AMBERLITE IR-45, IRA-47, IR-68, IR-48, IRA-93 (trade marks, weak base exchange resins sold by Rohm & Haas Co.); AMBERLITE IRA-400 series, IRA-900 series (trade marks, strong base exchange resins sold by Rohm & Haas Co.); and REXYN 200 series (trademark, strong base exchange resins sold by Fisher Scientific Ltd.).

The above list of commercial ion exchange resins is not exhaustive and other products will be found satisfactory. Generally, the resins are polymeric substances (e.g. polystyrene, polyacrylate and phenol formaldehyde polymers) which bear amine (weak base) or quaternary ammonium salt (strong base) functional groups and which have numerous pores of sufficiently large diameters to allow the passage of the lignin derivative polymer molecule which form the active ingredients of E-stage liquors.

In addition to ion exchange resins, the product AMBERLITE XAD-8 (trade mark, sold by Rohm & Haas Co.) is a non-ionic polymeric adsorbent resin and this adsorbs the lignin derivatives by a mechanism that is not apparently related to ion exchange. Accordingly, the concentration method is not limited to the use of ion exchange resins. It is believed that a person skilled in the art will readily be able to select suitable resins from commercial products by simple trial and error.

Incidentally, AMBERLITE XAD-8 is a methacrylate based polymer resin having a particle diameter of 20 to 60 mesh, a surface area of about 140 m$^2$/g and an average pore diameter of 250 Å. Activation prior to use with 1.5N caustic soda is required and E-stage liquor should be adjusted to pH 2.5 before it is brought into contact with the resin, and elution should be carried out with 1.5N caustic soda.

The oxidized and/or chlorinated lignin derivatives are acids or salts and are thus easily adsorbed by weak or strong base ion exchange resins. To displace the derivatives, a solution of a strong base is employed, e.g. 1.5 N NaOH as mentioned above.

Other suitable eluants include potassium and amonium hydroxides, and potassium carbonates and less preferably calcium hydroxide (lime).

The concentrated sacrificial agent solution obtained in this way can be employed with or without the iron complexing mentioned below. Even without such iron complexing, the sacrificial agent activity is improved because of the increase in concentration. Moreover, the more concentrated solution is not only more economical to transport than the dilute solution, but it can be evaporated to dryness much more economically. For example, the concentrated solution may have as little as 5% by volume of water as the untreated solution for the same amount of active solids contained therein. If the concentrated solution is evaporated to dryness, the dried product retains its sacrificial agent activity indefinitely and is thus a convenient product to ship and store.

All E-stage agents concentrated in this way have proved effective in preventing adsorption of surfactants on various rock formations, e.g. montmorillonite clay, berea sandstone and dolomite. Activity is independent of the type of mill (kraft or sulphite) used to produce the wood pulp, the wood species (hardwood or softwood) and bleach chemical used (chlorine or oxygen).

An interesting advantage of this aspect of the invention is that the sale of bleach plant effluent concentrate for enhanced oil recovery applications could eliminate pulp mill pollution control costs entirely.

While this concentration method is particularly suitable for E-stage liquor because of its dilute nature, oxidized and/or chlorinated lignin and lignin-like polyphenolic derivatives from other sources may be concentrated in the same way, if desired. This is because the sacrificial agents are polyphenolic products of relatively high molecular weight (i.e. at least 600) which are readily adsorbed onto macroporous ion exchange resins.

Moreover, it has been found that since the active sacrificial agent ingredients of E-stage liquor does not pass through cellophane dialysis membranes, other known methods of concentrating large polymeric products, including reverse osmosis and membrane filtration, are applicable to the present invention.

Cellophane dialysis membrane techniques remove low molecular weight carbohydrate based saccharinic acids and inorganic salts from E-stage liquor but the higher molecular weight lignin based derivatives are entirely retained by the dialysis membrane.

Reverse osmosis techniques, using semi-permeable membranes (including those made from cellulose acetate) and pressure to separate the water and salts from higher molecular weight material, may be employed to bring about purification and concentration of the active ingredients.

Having found that the active ingredients of E-stage liquor are oxidized and/or chlorinated lignin derivatives, the inventors identified other suitable sources of such derivatives as indicated below.

Sacrificial agents from these sources, while suitable for use without further treatment, may be subjected to the concentration method outlined above and/or the iron complexing method described later.

The new sources are:

(i) kraft black liquor which has been oxidized and/or chlorinated (ii) chlorinated spent sulphite liquor (iii) chlorinated sulphited hemlock tree bark (iv) oxidized lignin isolated from steam exploded poplar wood (using caustic soda)

(v) vanillin black liquor.

These sources of sacrificial agents have been identified by the inventors as particularly suitable because of their ready availability, low cost and have a high content of sacrificial agents. Each of the sources is explained in more detail in the following.

(i) Oxidized and/or chlorinated kraft black liquor.

Conversion of wood to wood pulp is generally carried out by one of two well known processes, namely the kraft process and the sulphite process. The object of both these processes is to free the cellulose fibres in the wood from the lignin and lignin-like materials which bind them together. The kraft process employs sodium hydroxide and sodium sulphide. These chemicals react with the lignin in the wood to produce water-soluble thiolignins, these being coloured products which give the "black liquor" its name. The black liquor is a waste product that is normally evaporated to dryness and then usually burned as a heat source and for the recovery of sodium and sulphur.

The inventors have now found that the black liquor, when oxidized and/or chlorinated, is useful as a sacrificial agent. Concentration in the manner discussed above for E-stage liquor is not usually necessary because the concentration of active ingredient in black liquor is normally quite high.

The oxidation can be carried out by heating the black liquor in the presence of oxygen under pressure and optionally in the presence of alkali for a period of several hours. The temperature is usually in the range of 80–120° C., preferably 90–110° C. and pressure ranges from 344 to 1378 kilopascals (50–200 psig) preferably 551 to 861 kilopascals (80–125 psig). The treatment time ranges from 1 to 10 hours preferably 3 to 5 hours. The resulting products may be mixtures of muconic acid salts. In the case of chlorination, the pre-oxidized or untreated black liquors (~20% w/w solids content) are treated at temperatures ranging from 21–50° C. without pH adjustment with sodium hypochlorite (12% available chlorine content). The amounts of hypochlorite employed range from 0.5 to 4 moles of chlorine equivalent per lignin phenyl propane unit estimated in the black liquor. After reaction times of up to 3 hours at 50° C., the mixtures are cooled and the pH's reduced to 7 before being tested for sacrificial activity.

If desired, other oxidants or chlorinating agents may be employed, or oxidation may even h carried out electrochemically.

Before the oxidation and/or chlorination is carried out, cellulose fibres should be removed and the solution must be alkaline. Kraft black liquor normally is alkaline, in which case the oxidation and/or chlorination can be carried out directly on the filtered product from the kraft process. If, for any reason, the liquor is neutral or acidic, it should first be made alkaline by the addition of a base, such as sodium hydroxide.

Oxidation alone or chlorination alone is effective, however when both oxidation and chlorination are carried out, a more effective sacrificial agent solution is formed. It does not matter whether chlorination follows oxidation or vice-versa.

(ii) Chlorinated spent sulphite liquor.

As noted above, the sulphite process is used for producing pulp from wood. The sulphite process normally employs sulphite salts of various bases, e.g. the ammonium, sodium or magnesium salts, or free sulphurous acid for rendering the lignin water soluble by converting it to water soluble lignin sulphonate salts which are then removed in the spent sulphite liquor.

In order to use spent sulphite liquor as a source of sacrificial agents, any remaining cellulose fibres are first removed (e.g. by filtration) and then the liquor is chlorinated, for example by treatment of each lignin phenyl propane unit present in the spent sulphite liquor with an equivalent of 1 mole of chlorine in the form of sodium hypochlorite at pH 12.5 for 1, hour at 22° C. followed by 1½ hours at 100° C. and one atmosphere for 1 to 2 hours. Higher temperatures and pressures may be employed if desired.

(iii) Chlorinated sulphited hemlock tree bark

Hemlock bark contains large amounts of lignin-like polyphenol compounds known as catechins and these can be removed by treating the bark with sodium bisulphite at high temperatures (e.g. 150°–200° C.) in a pressure vessel at a pH of between 2 to 7 for a period of 30 min. to 5 hours. This process is known and at present the product is used as drilling mud additives and as complexing agents for fertilizers etc.

(iv) Oxidized lignin isolated from poplar wood

Poplar wood contains lignin which can be extracted by steam exploding the wood structure followed by isolation of the lignin by treatment with sodium hydroxide. This process provides an economical source of lignin.

Lignin obtained in this way may be slurried with NaOH solution and oxidized by treating it with oxygen under pressure (e.g. 200–300 kPa) at elevated temperature (e.g. 80°–150° C. and preferably 100°–120° C.) for a period of several hours (usually 1 to 10 hours, and preferably 3 to 7 hours).

The oxidized product, which may be a mixture of muconic acid salts, thus obtained is suitable for use without further treatment in the iron complexing procedure mentioned below. By suitably selecting the amount of lignin slurried with the NaOH solution prior to the oxidation, the oxidized product can be made suitably concentrated for use without further concentration as carried out for E-stage liquor.

(v) Vanillin black liquor

Sodium vanillate is extracted commercially (e.g. by ITT Rayonier, Monsanto and others) from spent sulphite liquor following addition of excess sodium hydroxide and air oxidation.

After partial neutralization, the liberated vanillin is separated from the oxidized liquor by extraction into an immiscible organic solvent (usually butanol). It is then recovered from the solvent and purified by distillation and crystallization. The extracted solution (raffinate phase) consisting of a complex mixture of oxidized lignin and sodium sulphate is currently sold to kraft pulp mills as "make up liquor" valued for its high sodium content. However, the inventors have found that it has useful properties, similar to those oxidized kraft black liquor, as a source of sacrificial agents.

(b) Complexing sacrificial agents with ferrous or ferric ions

The inventors have found that the effectiveness of oxidized and/or chlorinated lignin and lignin-like (i.e. polyphenolic) sacrificial agents obtained from sources such as those above can be significantly improved when these products are complexed with ferrous or ferric ions. In fact, at least in laboratory conditions, iron complexed sacrificial agents may reduce the percentage of adsorbed surfactant during waterflooding to zero. The reason for this enhancement of activity is not known but it is substantial and unexpected. It is clear that the sacrificial agent complexes in some way (e.g. by chelation) with the metal ions because the enhancement of activity increases with metal ion addition until the ability of the sacrificial agents to form complexes is saturated and then further ferrous or ferric ion addition adversely affects the activity of the sacrificial agent, perhaps by the interaction of the free metal ions with subtaerranean rock formations to form insoluble precipitates.

Iron complexing is effective for enhancing the sacrificial agent activity not only of oxidized and/or chlorinated lignin derivatives (e.g. those obtained from E-stage liquor, kraft black liquor, chlorinated spent sulphite liquor, etc.) but also of ligin-like polyphenolic derivatives such as catechin derivatives obtained from hemlock bark as explained above. Iron complexing is thus believed to be effective with any oxidized and/or chlorinated lignin-like polyphenolic compounds derived from any suitable sources, e.g. agricultural products such as straw as well as forest industry products, provided such products show some activity as sacrificial agents prior to complexing and provided the products are indeed capable of forming complexes with ferrous or ferric ions.

Both ferrous and ferric forms of iron compounds produce effective sacrificial agents, but ferrous ions are preferred because they are generally more readily available as water soluble salts (e.g. as ferrous sulphate). However, any water soluble ferrous or ferric salt may be employed.

The manner in which and the temperature at which the iron compound is mixed with the source liquid is not critical. For example, the iron compound may be employed as a solid and dissolved in the source liquid or may first be dissolved in an aqueous liquid and then mixed with the source liquid. Ambient temperatures are generally employed, but any temperature between the freezing and boiling point of the source liquid may be used.

The amount of iron compound mixed with the source liquid is important because, as stated above, once an amount greater than that which can be held in complexed or chelated form is employed, the sacrificial activity is greatly reduced. This usually occurs at about 20% by weight of iron compound (calculated as ferrous or ferric ion) based on the total weight of organic material in the sacrificial agent solution. Normally about 5% by weight, preferably, 1–5% by weight, is employed, but there is really no effective lower limit because even small amounts of iron improve the activity to some extent.

The iron compound may be added directly to the source liquid to form an effective sacrificial agent which shows significantly improved activity compared with the source liquid used above. However, if the sacrificial agent solution is dilute, it is particularly advantageous first of all to concentrate the active ingredient in the manner indicated above, and then to add the iron compound to the concentrated solution (in the same percentage amounts as indicated above). This gives a sacrificial agent of very high activity which is also very economical to transport and to evaporate to dryness (if a solid product is desired).

As well as increasing the activity of the active ingredient, both in the dilute and concentrated forms, the addition of the iron compound also reduces the tendency of the activity of the sacrificial agent to decrease significantly with time. Indeed, if a source liquid is stored for a period of time so that its effectiveness as a sacrificial agent is reduced, the addition of an iron compound restores the activity, usually beyond that of the source liquid when fresh.

The sacrificial agents of the invention can be employed in enhanced oil recovery methods employing any anionic surfactant flooding technique. Examples of suitable surfactants are:

The sulphonated oils sold by Witco Organic Chemical Inc. under the trade name of Witco TRS 10-410, TRS-16 and TRS-18.

The sulphated oils sold by Stephan Chemical Company under the trade name Petrostep -HMW, -MMW, -420 and -465.

The techniques employed for enhanced oil recovery using surfactant flooding and sacrificial agents are well known in the art, so details need not be provided here. However, it should be noted that an aqueous solution of the sacrificial agent of the invention can be used to flood the formation before injection of the surfactant solution, or the sacrificial agent may be mixed with the surfactant solution prior to its injection. In the latter case it is believed that when the surfactant and sacrificial agents contact the rock or clay simultaneously, any surfactant initially adsorbed is subsequently desorbed by the sacrificial agent, making the surfactant available again for oil emulsification.

The sacrificial agents of the invention have proved extremely effective at the temperatures and brine concentrations experienced in reservoir environments during enhanced oil recovery.

The amount of sacrificial agent employed is not particularly critical, but a rock stratum usually has a limited capacity to adsorb the sacrificial agent, so if an excess is used it may just be wasted. The maximum useful concentration of the sacrificial agent is often 0.6 grams of the total organic carbon per kilogram of liquid (g TOC/kg).

All of the sacrificial agents of the invention have been found effective in preventing the adsorption of surfactants on such diverse minerals as montmorillonite clay, berea sandstone and dolomite.

The capital and running costs necessary for the production of sacrificial agents according to the invention are quite low so that a very economical product can be obtained.

The following Examples illustrate the method of producing sacrificial agents and the use of these materials. However, the Examples should not be taken as in any way limiting the scope of the invention.

First of all, however, the method of evaluating the effectiveness of the sacrificial agents as used in the Examples is explained below.

METHOD OF SACRIFICIAL AGENT EVALUATION

The procedure used in the following Examples to evaluate sacrificial agents was as follows. A thick 13% by weight solids content slurry of montmorillonite clay in 0.25 M sodium chloride amounting to 1 gram of clay solids was mixed with the appropriate quantity of sacrificial agent adjusted to pH 7 and diluted with 0.25 M salt solution to give a total of 25 grams of liquid phase. The mixture was subsequently agitated for a period of 20 hours during which time the equilibrium amounts of sacrificial agent adsorbed and remaining in solution were established. Clay solids were then sedimented using a centrifuge and the clear supernatant removed by decantation. The clay was subsequently treated with 40 ml of fresh 0.25 M salt solution for 4 hours, re-sedimented and the supernatant discarded to leave a thickened clay slurry which contained adsorbed sacrificial agent only.

The total organic carbon (TOC) level of the liquid phase before and after contact with the clay was the method used to estimate the uptake of sacrificial agent.

After treatment with sacrificial agent, the conditioned clay was then treated with a solution of Witco ® TRS 10-410 surfactant (Witco ® TRS 10-410 is one of several surfactants comprising of a sodium sulphonated oil specially manufactured by Witco Chemical Corporation for enhanced oil recovery applications) to produce a total of 40 ml of liquid phase in contact with the clay. The concentration of the sodium sulphonated oil (active ingredient) present was 0.008 N, or 5.44 grams per liter (gpl) of surfactant on an "as is" basis. (This includes unsulphonated oil amounting to 39% of the surfactant weight.) After agitating the resulting slurry overnight to allow sufficient time for adsorption equilibria to be established, the clay was sedimented and the clear supernatant liquid analyzed for surfactant by a two phase titration procedure (as set forth by V. W. Reid in "Determination of Anion Active Detergents by Two Phase Titration", 1967, Tenside 4, 292–304).

Graphs of percentage surfactant adsorbed versus concentration of sacrificial agent in grams TOC per kilogram of solution (g TOC/kg soln.) applied to the clay were then made. These showed that, in general, effective agents resulted in minimum losses of surfactant when this concentration reached approximately 0.5 g TOC/kg soln. In view of this observation, in order to screen substances for sacrificial agent activity, the percentage surfactant adsorbed when the agent was applied to montmorillonite at approximately the 0.5 g TOC/kg soln. level was used to gauge its effectiveness. Potent sacrificial agents were those that reduced surfactant adsorption to zero.

EXAMPLE 1

Concentration of Chlorolignins in E-stage Liquor and Their Conversion into Effective Sacrificial Agents Using Ferrous Sulphate Dow XF-4004® resin (a weak base anion exchange resin) was used to collect the active ingredients in E-stage liquor so that they subsequently could be recovered in concentrated form. This resin is representative of those commercially available for decolourizing and detoxifying bleach plant effluent.

Typically 20 g of the resin (equivalent to 35 mL of wet resin) was placed in a 2 cm diamter × 10 cm column. After conversion to the sulphate ion form using 3 bed volumes of 1.5 N sulphuric acid, 1400 ml (or about 40 bed volumes) of brown coloured E-stage liquor (total solids content 4.8 gpl, 0.526 g TOC/kg. soln.) was slowly passed through the bed at a rate of about 1 ml/min. Following passage of this volume of waste effluent, coloured liquor emerged from the column. The resin was then considered to be saturated with the coloured chlorolignin components of the E-stage liquor. Colourless saccharinic acid salts, other carbohydrate derived components and sodium chloride also present in the liquor were not retained by the resin. All the coloured chlorolignins were then eluted from the resin using a total of 75 ml of 1.5 N sodium hydroxide solution at a rate of about 1 ml/min. The dark concentrate recovered containing 7.0 g TOC/kg soln. was then neutralized. A portion was treated with ferrous sulphate heptahydrate ($FeSO_4 7H_2O$) at a level amounting to approximately 2% by weight ferrous iron based on the estimated weight of recovered organic material. The recovery of all the coloured compounds in the above volume of eluate represents an 18.6 fold increase in concentration of the active ingredients by the resin.

Concentrate containing ferrous sulphate, concentrate to which no iron was added, and unconcentrated E-stage liquor were then adjusted to approximately 0.5 g TOC/kg soln. and sodium chloride added to a level of 0.25 M. These solutions were then tested for sacrificial agent activity as described above. The results obtained were as follows:

| E-Stage Liquor Treatment | Surfactant Adsorbed (%) |
|---|---|
| Concentration on decolourizing resin with subsequent addition of ferrous sulphate | 0 |
| As above, no ferrous sulphate addition | 41 |
| No concentration with addition of ferrous sulphate | 0 |
| No concentration, no ferrous sulphate addition | 68 |

These results show how ferrous ion increases the sacrificial agent activity of both unconcentrated E-stage liquor and the components recovered from concentrate. They also show that collection on the decolourizing resin selectively concentrates the organic material responsible for sacrificial agent activity (active ingredient).

If it were necessary to ship a dry sacrificial agent from E-stage liquor, prior concentration using a decolourizing resin would reduce the volume of water to be evaporated to about 5% of that in untreated liquor. It has been found that the dry solids in E-stage liquor can be stored indefinitely without any loss of sacrificial agent activity. This applies also to the iron complexes held in the dry state. Concentration using resins therefore contributes to the production of sacrificial agents that can be held in storage.

EXAMPLE 2

Preparation and Sacrificial Agent Activity Testing of Oxidized Black Liquor Iron Complex Seventeen hundred millilitres (1700 ml) of kraft black liquor (total solids content 19% w/w; pH 12.6) were placed in a 2 liter autoclave fitted with a mechanical stirrer, sample port, gas inlet pipe, pressure gauge and heating jacket. After purging out air, oxygen was introduced into the autoclave and maintained at 689 kPa (100 psig) regulator pressure while the temperature was raised to 110° C. with vigorous stirring.

After 240 minutes at this temperature, oxidized black liquor was withdrawn from the autoclave. The pH was found to have dropped to 8.3 due to neutralization of the alkali by carboxylic acids formed in the oxidation. After complete neutralization to pH 7, a portion of the liquor was treated with ferrous sulphate heptahydrate ($FeSO_4 7H_2O$) at a level of 5% by weight ferrous ion based on the solids content of the liquor. The oxidized liquor containing the ferrous sulphate, that containing no iron, unoxidized black liquor and unoxidized black liquor containing 5% ferrous ion based on solids content were then diluted to approximately 0.5 g TOC/kg solution. After addition of sodium chloride to a level of 0.25 M the solutions were tested for sacrificial agent activity. The results obtained were as follows:

| Black Liquor Treatment | Surfactant Adsorbed (%) |
|---|---|
| Oxidized with subsequent addition of ferrous sulphate | 0 |
| Oxidized with no ferrous sulphate addition | 23 |
| No treatment with ferrous sulphate addition | 62 |
| No treatment, no ferrous sulphate addition | 87 |

These results show that ferrous sulphate increases the sacrificial agent activity of both unoxidized and oxidized black liquor, but the improvement to the latter is significantly greater.

EXAMPLE 3

Preparation and Sacrificial Agent Activity Testing of Oxidized Poplar Wood Lignin Iron Complex Fifty grams (50 g) of lignin received from Stake Technology Ltd. of Ottawa, Canada was slurried with 1 litre of 0.5 N sodium hydroxide solution. (The solid lignin product was prepared by Stake Technology by acidification of a sodium hydroxide extract of steam exploded poplarwood. This steam-treated wood, whose Trade Name is Pro-Cell, is conventionally used as cattlefeed.) After 10 g of insoluble cellulose fibre had been removed by filtration from the solution in caustic soda, the solution was oxidized for 6 hours using oxygen in a stirred autoclave held at 110° C. and 276 kPa pressure.

After cooling and adjusting to pH 7, ferrous sulphate heptahydrate (FeSO$_4$7H$_2$O) was added to a portion of the product at a level of 1% ferrous ion by weight based on the estimated solids content. This solution and that containing no added iron were the diluted to approximately 2.7 g TOC/kg soln. and evaluated for sacrificial agent activity. The results and data for unoxidized poplar wood lignin at this concentration show the benefit of oxidation and ferrous ion addition:

| Poplar Wood Treatment | Surfactant Adsorbed (%) |
|---|---|
| None | 72 |
| Oxidized with oxygen for 6 hrs at 276 kPa at 110° C. with no ferrous sulphate addition | 40 |
| As above with ferrous sulphate addition | 0 |

EXAMPLE 4

Preparation and Sacrificial Agent Activity Testing of Sulphited Hemlock Tree Bark Extract Ferrous Iron Complex A mixture of shredded wet hemlock tree bark equivalent to 150 g of dry bark, 17.1 g of sodium bisulphite and 1200 mL of water were heated in an autoclave to 170° C. for 60 minutes and then cooled. The liquid extract was separated from the bark by filtration, adjusted to pH 7 and the solids content determined. To a portion of the extract was added ferrous sulphate heptahydrate (FeSO$_4$7H$_2$O) at a level equivalent to 5% by weight of ferrous ion based on the weight of the solids. After diluting the extract and that containing iron to approximately 0.75 TOC/kg soln. they were evaluated for sacrificial agent activity. The benefit of the ferrous ion on the effectiveness in this application is illustrated below:

| Sulphited Hemlock Tree Bark Extract Treatment | Surfactant Adsorbed (%) |
|---|---|
| None | 50 |
| Ferrous sulphate added | 0 |

EXAMPLE 5

Preparation & Sacrificial Agent Activity Testing of the Ferrous Ion Complex of "Vanillin Black Liquor" (Oxidized Spent Sulphite Liquor)

So called "Vanillin Black Liquor" generated by ITT Rayonier in the manner described earlier and containing 30% total solids, 20% sodium, 4.2% sulphur was completely neutralized with sulphuric acid. Ferrous sulphate heptahydrate (FeSO$_4$7H$_2$O) at a level equivalent to 5% by weight of ferrous ion based on the total solids was then added to a portion of the liquor. After diluting the iron complex and the liquor containing no iron to 0.6 g TOC/kg soln., the solutions were evaluated for sacrificial agent activity. The benefit of the ferrous ion on the effectiveness in this application is illustrated below:

| Oxidized Spent Sulphite Liquor Treatment | Surfactant Adsorbed (%) |
|---|---|
| None | 51 |
| Following addition of 5% ferrous ion on total solids | 2 |

EXAMPLE 6

Sacrificial Agent Effectiveness of Caustic Bleach Plant Effluent (E-Stage Liquor) Following its Complexation with Either Ferrous or Ferric Ion (1) E-Stage Liquor Receiving No Concentration Table 1 summarizes data obtained using E-stage liquor as a sacrificial agent which had not been concentrated on a resin, but used as received from the mill following pH adjustment and iron addition It will be noted that E-stage liquor loses some of its sacrificial activity on aging. However, this can be restored to higher than the original levels for fresh material by the addition of up to approximately 4% by wt. ferrous ion based on E-stage liquor solids. This is only provided that the liquor is neutralized beforehand. Ferric ion is also effective in improving activity.

TABLE 1

EFFECT OF CAUSTIC BLEACH PLANT EFFLUENT (E-STAGE) AGE AND IRON ADDITION ON SACRIFICIAL AGENT ACTIVITY[1]

| RUN NO. | E-STAGE LIQUOR BATCH AND AGE | IRON (% by wt. based on Solids) | Applied to Clay Slurry (g TOC/kg Slurry) | Adsorbed on Clay (g TOC/kg Clay) | SURFACTANT ADSORBED (%) |
|---|---|---|---|---|---|
| — | No addition | N/A | 0.0 | 0.0 | 87 |
| 1 | I fresh | 0 | 0.66 | 3.8 | 13 |
| 3 | I 4 weeks | 0 | 0.66 | 1.7 | 25 |
| 4 | I 8 weeks | 0 | 0.69 | 1.0 | 28 |
| 5 | I 10 weeks | 0 | 0.67 | 0.24 | 24 |
| 77 | I 1 year | 0 | 0.91 | 3.1 | 63 |
| 77 | I 1 year | Fe$^{2+}$, 1 | 0.78 | 2.5 | 26 |
| 77 | I 1 year | Fe$^{2+}$, 2 | 0.79 | 2.3 | 26 |
| 77 | I 1 year | Fe$^{2+}$, 4 | 0.82 | 5.8 | 19 |
| 77 | I 1 year | Fe$^{2+}$, 4 | 0.81 | 4.6 | 0[3] |
| 77 | I 1 year | Fe$^{3+}$, 4 | 0.84 | 4.7 | 5.8 |

Footnotes:
[1]Substrate -montmorillonite clay in 0.25 M NaCl. Surfactant - Witco ® TRS 10-410 as received.
[2]Estimated from plot of concentration versus % surfactant adsorbed.
[3]E-stage adjusted to pH 7 prior to Fe addition.

(2) Sacrificial Agent Activity of E-Stage Liquor Recovered from Resins

Table 2 summarizes the sacrificial agent activities of both iron complexed and non-complexed E-stage liquors from several sources before and after concentration on decolourizing resins.

before concentration of the E-stage liquor on the resin results in a product with practically no sacrificial agent activity, i.e., almost all the surfactant is adsorbed onto the clay following treatment with such an agent. No

TABLE 2

SACRIFICIAL AGENT ACTIVITY OF E-STAGE LIQUORS AND E-STAGE LIQUORS FROM CONCENTRATES WITH AND WITHOUT FERROUS ION ADDITION
(22° C. 0.25 M NaCl, Montmorillonite Clay)

| RUN NO. | E-STAGE LIQUOR DESCRIPTION[1] | | | RESIN USED FOR CONCEN-TRATION | FERROUS ION ADDITION LEVEL (%) AND TIME | INITIAL TOC CONC. APPLIED TO CLAY (g/kg SOLN.) | SACRIFICIAL AGENT ADSORBED (g TOC/kg CLAY) | SURFACTANT ADSORBED (%) |
|---|---|---|---|---|---|---|---|---|
| | SOURCE | PROCESS | WOOD | CHEM-ICAL | | | | |
| 107 | BCFP | K | SW | Cl | None[3] | 0 | 0.42 | 0.23 | 68 |
| 107 | BCFP | K | SW | Cl | None | 2A | 0.42 | 2.7 | 0 |
| 107 | BCFP | K | SW | Cl | Amberlite | 0 | 0.20 | −0 | 59 |
| 107 | BCFP | K | SW | Cl | Amberlite | 2A | 0.20 | 5.4 | 1 |
| 108 | BCFP | K | SW | Cl | Amberlite | 1A | 0.17 | 0.8 | 5 |
| 108 | BCFP | K | SW | Cl | Amberlite | 2B | 0.17 | −0 | 80 |
| 107 | BCFP | K | SW | Cl | Dow | 0 | 0.26 | 1.6 | 61 |
| 107 | BCFP | K | SW | Cl | Dow | 2A | 0.26 | 3.2 | 0 |
| 108 | BCFP | K | SW | Cl | Dow | 1A | 0.28 | 1.8 | 3 |
| 108 | BCFP | K | SW | Cl | Dow | 2B | 0.31 | 0.4 | 71 |
| 110 | BCFP | K | SW | Cl | Dow | 0 | 0.56 | 0.3 | 41 |
| 110 | BCFP | K | SW | Cl | Dow | 1A | 0.56 | 3.2 | 0 |
| 109 | GP(a) | S | SW | Cl | None | 0 | 0.71 | 0 | 70 |
| 109 | GP(a) | S | SW | Cl | None | 2A | 0.71 | 3.6 | 0 |
| 111 | GP(a) | S | SW | Cl | Dow | 0 | 0.34 | 0.8 | 36 |
| 111 | GP(a) | S | SW | Cl | Dow | 1A | 0.36 | 1.5 | 0 |
| 109 | GP(b) | S | SW | Cl | None | 0 | 0.77 | 3.1 | 83 |
| 109 | GP(b) | S | SW | Cl | None | 2A | 0.77 | 7.3 | 13 |
| 111 | GP(b) | S | SW | Cl | Dow | 0 | 0.20 | −0 | 80 |
| 111 | GP(b) | S | SW | Cl | Dow | 1A | 0.19 | 3.8 | 0 |
| 110 | E(b) | K | HW | O | None | 0 | 0.54 | 1.3 | 75 |
| 110 | E(b) | K | HW | O | None | 2A | 0.54 | 4.6 | 0 |
| 111 | E(b) | K | HW | O | Dow | 0 | 0.28 | −0 | 83 |
| 111 | E(b) | K | HW | O | Dow | 1A | 0.28 | 5.0 | 0 |
| 110 | E(a) | K | SW | O | None | 0 | 0.56 | 2.0 | 79 |
| 110 | E(a) | K | SW | O | None | 2A | 0.54 | 5.5 | 0 |
| 111 | E(a) | K | SW | O | Dow | 0 | 0.2 | −0 | 85 |
| 111 | E(a) | K | SW | O | Dow | 1A | 0.19 | −0 | 11 |
| 112 | PA | K | HW | Cl | None | 0 | 0.34 | 0.9 | 83 |
| 112 | PA | K | HW | Cl | None | 2A | 0.34 | 3.0 | 19 |
| 115 | PA | K | HW | Cl | Dow | 0 | 0.18 | 2.2 | 51 |
| 115 | PA | K | HW | Cl | Dow | 2A | 0.17 | 1.9 | 5.0 |

[1]Source legend:
BCFP British Columbia Forest Products
GP(a) (b) Georgia Pacific sample
E(a) (b) Espanola Division of Eddy Pulp & Paper, see Appendix 1 for more details
PA Prince Albert Pulp
K Kraft pulp process; SW = softwood; HW = hardwood
C Chlorination used in 1st stage of bleach plant
O Oxygen used in 1st stage of bleach plant
[2]A - Ferrous ion added to E-stage after concentration on resin, level based upon original E-stage solids
B - Ferrous Ion added to E-stage before concentration on resin level, based upon original E-stage solids The most important conclusion that can be drawn from these results is that concentrates eluted from decolourizing resins with sodium hydroxide contain the organic ingredients responsible for sacrificial activity. These are the lignin derived fractions. Furthermore, all E-stage liquors examined, irrespective of whether they originate from kraft or sulphite mills, pulping hardwoods or softwoods, and employing either chlorine or oxygen in the bleach plant appear to contain useful sacrificial agents. Not shown in Table 2 is the almost total lack of activity of the colourless organic components (cellulose derived fractions) which are not adsorbed on the resins. (Thus, under standard screening conditions the application of 0.47 g TOC/kg solution of the non-resin adsorbed fractions resulted in a clay containing 1.5 g TOC/kg clay which adsorbed 74% of the Witco® TRS 10-410 surfactant applied, cf. addition of no additive, 68% surfactant adsorbed).

The effect of ferrous ion addition on activity when added before and after concentration is also shown in Table 2. It will be seen that addition of ferrous ion explanation for this observation has been found. On the other hand, addition of ferrous ion to E-stage liquor after concentration increases sacrificial agent activity significantly.

It will be seen from Table 2 that in comparable experiments the level of TOC applied to the clay following concentration is always significantly less than that applied from E-stage which was not concentrated. This is due to the fact that following concentration and redilution to the volume of E-stage applied to the resin column, the contribution to TOC of non-resin-adsorbed components is lost. Since components not adsorbed on the decolourizing resins (i.e. the cellulose derived fractions) showed little sacrificial agent activity, their absence in evaluating the activity of the concentrates is not important. The non-adsorbed colourless E-stage components are thought to be derived from cellulose and other wood carbohydrates (saccharinic acids) while the coloured active ingredients retained by the resin are believed to be chlorolignins.

EXAMPLE 7

(3) Sacrificial Agent Activity of E-Stage Lignins Derived from Concentrates on Various Mineral Substrates at 22 and 60° C.

The results given in Table 3 show that sacrificial agent activity of two different E-stage liquors derived from concentrates is independent of evaluation temperatures between 22° and 60° C. The table also shows that the same agents exhibit their activity on berea sandstone, dolomite and montmorillonite clay, oil bearing minerals of widely different structure and affinity for surfactant. Furthermore, the addition of ferrous ion increases the activity on all substrates at both 22° and 60° C. on all minerals examined.

EXAMPLE 8

Sacrificial Agent Activity on Montmorillonite of E-Stage Liquors Derived from Concentrates at High Bine, Calcium and Magnesium Levels The results given in Table 4 using montmorillonite show that increasing the brine concentration from 0.25 M to 1M increases the effectiveness of those E-stage sacrificial agents derived from concentrates which are not complexed with ferrous ion. In the presence of ferrous ion all sacrificial agents completely eliminate surfactant adsorption at brine concentrations in the range 0.25–1.0 M. On the other hand, Table 4 suggests that 200 ppm levels of both calcium and magnesium slightly decrease the effectiveness of both the ferrous ion complexed and non-complexed agents.

TABLE 3

SACRIFICIAL AGENT ACTIVITY OF E-STAGE LIQUORS DERIVED FROM CONCENTRATES ON VARIOUS MINERAL SUBSTRATES AT 22° AND 60° C. (0.29 M NaCl)

| RUN NO. | E-STAGE LIQUOR CONCENTRATE SOURCE[1] | FERROUS ION ADDITION | MINERAL SUBSTRATE | TEMPERATURE (°C.) | INITIAL SACRIFICIAL AGENT CONCENTRATION (g TOC/kg SOLUTION) | SACRIFICIAL AGENT ADSORBED (g TOC/kg SUBSTRATE) | SURFACTANT ADSORBED (%) |
|---|---|---|---|---|---|---|---|
| 114 | GP(a) | No | Berea sandstone | 22 | 0.50 | — | 5 |
| 114 | GP(a) | Yes | Berea sandstone | 22 | 0.50 | — | 0 |
| 114 | None (control) | No | Berea sandstone | 22 | 0 | 0 | 9 |
| 114 | GP(a) | No | Berea sandstone | 60 | 0.50 | — | 5 |
| 114 | GP(a) | Yes | Berea sandstone | 60 | 0.50 | — | 1 |
| 114 | None (control) | No | Berea sandstone | 60 | 0 | 0 | 10 |
| 114 | GP(a) | No | Dolomite | 22 | 0.5 | — | 14 |
| 114 | GP(a) | Yes | Dolomite | 22 | 0.5 | — | 8 |
| 114 | None (control) | No | Dolomite | 22 | 0 | 0 | 25 |
| 114 | GP(a) | No | Dolomite | 60 | 0.5 | — | 14 |
| 114 | GP(a) | Yes | Dolomite | 60 | 0.5 | — | 8 |
| 114 | None (control) | No | Dolomite | 60 | 0 | 0 | 28 |
| 106 | BCFP | No | Montmorillonite | 22 | 0.47 | 1.0 | 52 |
| 106 | None (control) | No | Montmorillonite | 22 | 0 | 0 | 89 |
| 106 | BCFP | No | Montmorillonite | 60 | 0.47 | 1.0 | 59 |
| 106 | None (control) | No | Montmorillonite | 60 | 0 | 0 | 88 |
| 115 | GP(a) | No | Montmorillonite | 22 | 0.37 | 0.23 | 38 |
| 115 | GP(a) | Yes | Montmorillonite | 22 | 0.33 | 0.17 | 0 |
| 115 | GP(a) | No | Montmorillonite | 60 | 0.37 | 0.23 | 56 |
| 115 | GP(a) | Yes | Montmorillonite | 60 | 0.33 | 0.17 | 0 |

Source legend:
GP(a) = Georgia Pacific, E-stage liquor
BCFP = British Columbia Forest Products E-stage liquor, see Appendix I.

TABLE 4

SACRIFICIAL AGENT ACTIVITY ON MONTMORILLONITE CLAY OF E-STAGE LIQUORS DERIVED FROM CONCENTRATES AT HIGH BRINE, CALCIUM AND MAGNESIUM LEVELS (22° C.)

| RUN NO | SACRIFICIAL AGENT DESCRIPTION[1] | FERROUS ION ADDITION | SOLUBLE MINERAL NAME | CONC. | INITIAL SACRIFICIAL AGENT CONCENTRATION (g TOC/kg SOLUTION) | SACRIFICIAL AGENT ADSORBED (g TOC/kg CLAY) | SURFACTANT ADSORBED (%) |
|---|---|---|---|---|---|---|---|
| 112 | GP(a) | No | NaCl | 0.5 M | 0.4 | ~0 | 45 |
| 112 | GP(a) | Yes | NaCl | 0.5 M | 0.4 | ~0.4 | 0 |
| 112 | None (control) | No | NaCl | 0.5 M | 0 | 0 | 88 |
| 112 | GP(a) | No | NaCl | 1.0 M | 0.4 | ~0.4 | 36 |
| 112 | GP(a) | Yes | NaCl | 1.0 M | 0.4 | ~0.4 | 0 |
| 112 | None (control) | No | NaCl | 1.0 M | 0 | 0 | 87 |
| 113 | GP(a) | No | $CaCl_2$[2] | 200 ppm | 0.41 | ~0 | 76 |
| 113 | GP(a) | Yes | $CaCl_2$[2] | 200 ppm | 0.41 | 2.4 | 1 |
| 113 | None (control) | No | $CaCl_2$[2] | 200 ppm | 0 | 89 | 89 |
| 113 | GP(a) | No | $MgCl_2$ | 200 ppm | 0.41 | ~0 | 82 |
| 113 | GP(a) | Yes | $MgCl_2$ | 200 ppm | 0.41 | 2.4 | 1 |
| 113 | None (control) | No | $MgCl_2$ | 200 ppm | 0 | 0 | 89 |

[1]GP(a) = Georgia Pacific E-stage liquor
[2]Calcium and magnesium chlorides ($CaCl_2$, $MgCl_2$) present in addition to 0.25 M NaCl.

EXAMPLE 9

Sacrificial Agent Activity on Montmorillonite of E-Stage Liquors Derived from Dried and Aged Concentrates The results summarized in Table 5 show that E-stage liquor after concentration on a decolourizing resin and subsequent evaporation to dryness at 105° C. can be stored at 22° C. for at least 2 months without any loss in activity. Previous data had shown that the sacrificial agent activity of untreated E-stage liquor itself deteriorated with time. Evaporation to dryness following pre-concentration on an absorption resin appears to stabilize the product.

Data Supporting Sacrificial Agent Effectiveness of Oxidized and Chlorinated Kraft Black Liquor Following Complexation with Iron Table 6 shows the effects of various treatments of kraft black liquor on the sacrificial agent activity.

It is to be noted in particular that oxidation followed by chlorination improved sacrificial activity (See Run 27 in Table 6). It can be predicted that the addition of ferrous ion to this mixture would further improve the sacrificial agent activity.

TABLE 5

SACRIFICIAL AGENT ACTIVITY ON MONTMORILLONITE OF E-STAGE LIQUOR[1]
DERIVED FROM AGED CONCENTRATES
(0.25 M NaCl at 22° C.)

| RUN NO. | METHOD OF CONCENTRATION | FERROUS ION ADDITION | AGING AFTER CONCENTRATION AT 22° C. | INITIAL SACRIFICIAL AGENT CONCENTRATION (g TOC/kg SOLUTION) | SACRIFICIAL AGENT ADSORBED (g TOC/kg CLAY) | SURFACTANT ADSORBED (%) |
|---|---|---|---|---|---|---|
| 110 | Dow Resin only | No | None | 0.56 | 0.3 | 41 |
| 110 | Dow Resin only | Yes | None | 0.56 | 3.2 | 0 |
| 115 | Dow Resin followed by evaporation to dryness at 105° C. | No | 2 months | 0.53 | 5.5 | 11 |
| 115 | Dow Resin followed by evaporation to dryness at 105° C. | Yes | 2 months | 0.49 | 9.6 | 0 |

[1]GP(a) Georgia Pacific E-stage liquor

TABLE 6

EFFECT OF VARIOUS CHEMICAL TREATMENTS ON THE SACRIFICIAL AGENT ACTIVITY
OF KRAFT BLACK LIQUOR[1]

| RUN NO. | TREATMENT | SACRIFICIAL AGENT CONCENTRATION APPLIED TO CLAY FOR MINIMUM SURFACTANT LOSS[2] | |
|---|---|---|---|
| | | (g TOC/kg Solution) | Surfactant Adsorbed (%) |
| — | No addition of any agent | 0 | 87 |
| 14 | No treatment of black liquor | 0.95 | 45 |
| 16 | Oxidized (4 hours @ 110° C., 689 kPa) | 0.79 | 21 |
| 56 | Oxidized (2 hours @ 180° C., 2068 kPa) | 0.97 | 68 |
| 38 | Oxidized in presence of sodium hydroxide (11 hours) | 0.80 | 23 |
| 43 | Oxidized at lower pH (3 hours) | 0.80 | 26 |
| 38 | Air oxidation (13 hours) | 0.80 | 17 |
| 23 | Chlorinated (2 Moles) | 0.91 | 66 |
| 27 | Oxidized (4 hours @ 110° C., 689 kPa) + chlorinated (2 Moles) | 0.87 | 9 |
| 44 | Chlorinated (2 Moles), then oxidized (7 hours) | 0.80 | 35 |
| 60 | Heated (1 hour @ 230° C.) | 0.74 | 34 |
| 63 | Heated (1 hour) & chlorinated (2 Moles) | 0.66 | 27 |
| 56 | Formaldehyde (3 Moles) (72 hours @ 105° C.) | 1.22 | 47 |
| 56 | Oxidized (5 hours) + formaldeyde (3 Moles) | 1.24 | 25 |
| 75 | None plus ferrous sulphate (5% Fe) | 0.65 | 62 |
| 79 | Oxidized (4 hours @ 110° C., 689 kPa) + ferrous sulphate (5%) at pH 7 | 0.86 | 0 |

Footnotes:
[1]Substrate - Montmorillonite clay in 0.25 M NaCl.
Surfactant - Witco TRS 10-410 as received.
[2]Estimated from plot of concentration versus % surfactant adsorbed or from available data.

EXAMPLE 10

Chlorinated Spent Sulphite Liquor

Spent sulphite liquor was chlorinated by treatment with sodium hypochlorite at pH 12.5, as follows.

Two grams of Lignosite (an aqueous solution containing 50% spent sulphite liquor solids containing no fermentable carbohydrates, obtained from Georgia Pacific Corporation) was adjusted to pH 12.5 and diluted to 10 ml with water. 2 mL of sodium hypochlorite containing 12% available chlorine was then added to the Lignoite. This is equivalent to approximately 1 mole of chlorine per lignin phenyl propane unit. After 60 minutes at 22° C., the mixture was heated to 100° C. for 90 minutes before being cooled, adjusted to pH 7, diluted to a concentration of 0.8 g TOC/kg solution and evaluated for sacrificial agent activity. The benefit of chlorination is seen when compared to the effectiveness of unchlorinated lignin sulphonate at the same concentration:

| Sacrificial Agent | Surfactant Adsorbed % |
|---|---|
| Unchlorinated Lignosite | 61 |
| Chlorinated Lignosite | 34 |

We claim:

1. In a method of obtaining oil from a subterranean rock formation which comprises displacing the oil from the formation by a waterflood technique employing a surfactant to improve the miscibility of the oil and the water and a sacrificial agent to reduce the amount of the surfactant required, the improvement which comprises employing as said sacrificial agent an oxidized and/or chlorinated lignin derivative obtained from dilute caustic bleach plant effluent liquor by a concentration and purification step capable of separating said derivative from other components of said liquor and selected from the group consisting of adsorption of said derivative by a macroporous resin followed by elution, reverse osmosis and membrane dialysis; and wherein said derivative is complexed with iron ions prior to use in said waterflood technique.

2. In a method of obtaining oil from a subterranean rock formation which comprises displacing the oil from the formation by a waterflood technique employing a surfactant to improve the miscibility of the oil and the water and a sacrificial agent to reduce the amount of surfactant required, the improvement which comprises employing as said sacrificial agent a complex of an oxidized and/or chlorinated polyphenolic derivative having a molecular weight of at least 600 with ferrous or ferric ions; said derivative being obtained from a source selected from the group consisting of caustic bleach plant effluent liquor, kraft black liquor which has been oxidized and/or chlorinated, chlorinated spent sulphite liquor, chlorinated sulphited hemlock bark, and oxidized lignin solution obtained from steam exploded popular wood.

3. A method according to claim 2 wherein said derivative is obtained from a kraft black liquor which has been both oxidized and chlorinated.

* * * * *